United States Patent [19]
Matsuo et al.

[11] Patent Number: 6,066,301
[45] Date of Patent: May 23, 2000

[54] DEODORIZING SYSTEM

[75] Inventors: Mamoru Matsuo, Yokohama; Ryoichi Tanaka, deceased, late of Tokyo; by Hiroko Tanaka; Kanako Maehara, both of Tokyo; by Rie Oshima, Chofu; by Shinichi Tanaka, Tokyo, all of Japan

[73] Assignee: Nippon Furnace Kogyo Kabushiki Kaisha, Kanagawa, Japan

[21] Appl. No.: 09/091,701

[22] PCT Filed: Dec. 27, 1996

[86] PCT No.: PCT/JP96/03885

§ 371 Date: Jun. 24, 1998

§ 102(e) Date: Jun. 24, 1998

[87] PCT Pub. No.: WO97/24559

PCT Pub. Date: Jul. 10, 1997

[30] Foreign Application Priority Data

Dec. 28, 1995 [JP] Japan .................................... 7-342538

[51] Int. Cl.[7] ........................................................ F01N 3/10
[52] U.S. Cl. .......................... 422/175; 422/120; 422/182; 454/53; 165/4; 165/47; 165/97; 118/61
[58] Field of Search ...................... 422/120, 168, 422/175, 182; 454/52, 53; 165/4, 47, 96, 97, 108; 118/58, 61, 64

[56] References Cited

FOREIGN PATENT DOCUMENTS

| | | |
|---|---|---|
| 49-34061 | 3/1974 | Japan . |
| 49-83264 | 8/1974 | Japan . |
| 54-104669 | 8/1979 | Japan . |
| 60-33205 | 8/1985 | Japan . |
| 7-158845 | 6/1995 | Japan . |
| 61106721 | 5/1996 | Japan . |

*Primary Examiner*—Elizabeth McKane
*Attorney, Agent, or Firm*—Notaro & Michalos P.C.

[57] ABSTRACT

The present invention relates to a deodorizing system for reducing the size of a facility and realizing the thermal efficiency much higher than the prior art, wherein a deodorizing furnace 1 is connected with thermal equipment 8 which uses a heated gas current as a heat source through an out-of-furnace circulating path 4 in order to circulate combustion exhaust gas in a deodorizing furnace 2 which has been used for incineration or thermal decomposition of odor components. When the combustion exhaust gas passes through a regenerative bed 5A or 5B on an intake side of the out-of-furnace circulating path, a part of sensible heat of the combustion exhaust gas is recovered in the regenerative bed 5A or 5B and the combustion exhaust gas is turned into a heated gas current that can be used in the thermal equipment 8 to be then supplied to the thermal equipment 8. Subsequently, upon completion of a predetermined process in the thermal equipment 8, the combustion exhaust gas is again made to have a high temperature and returned to the deodorizing furnace 2 by utilizing the recovered heat in the regenerative bed 5B or 5A on an outlet side of the out-of-furnace circulating path.

11 Claims, 4 Drawing Sheets

DEODORIZING SYSTEM

FIELD OF THE INVENTION

The present invention relates to a deodorizing system for removing odors generated in a thermal equipment which utilizes a gas current having a relatively-medium/low temperature in a hot-air drier or a foaming oven as a heat source to carry out a predetermined process.

BACKGROUND OF THE INVENTION

A deodorizing system such as shown in FIG. 5 has been conventionally adopted in a process for removing gas (referred to as odor gas) including odor components generated in a foaming oven or a hot-air drier such as a paint drying oven. The deodorizing system comprises: a hot blast stove 102 for supplying hot air having a medium/low temperature; a thermal equipment 101 such as a hot-air drier or a foaming oven for utilizing hot air supplied from the hot blast stove 102 to effect predetermined drying or foaming process on a work W; and a deodorizing furnace 103 which takes out and burn or heat-decomposes the odor gas generated in the thermal equipment 101 for deodorization. Here, hot air having a medium/low temperature, e.g., approximately 300° C. required in the thermal equipment 101 is generated in the hot blast stove 102, and atmosphere gas or flames having a high temperature, e.g., approximately 1000° C. required for burning or heat-decomposing the odor gas components is formed in the deodorizing furnace 103.

The odor gas generated in a paint drying oven or a foaming oven, however, includes a large quantity of mist before deodorization and this mist is high-temperature gas including a large amount of carbonized dust after deodorization, whereby heat recovery becomes difficult. Even though a heat exchanger is used to carry out heat recovery, the heat exchanger may soon be out of service and the heat efficiency is low. Thus, the high-temperature gas generated in the deodorizing furnace is not subjected to the effective heat utilization and it is directly exhausted. A difference in temperature between the heat required in the thermal equipment and the heat required for deodorization is not less than approximately 700° C., and hence a common heat source can not be used. Two different heat sources must be prepared for the hot blast stove and the deodorizing furnace, thereby taking a large space and increasing the facility cost.

DISCLOSURE OF THE INVENTION

It is, therefore, an object of the present invention to provide a deodorizing system having a compact equipment and a thermal efficiency that is much higher than that in the prior art.

To achieve this aim, the present invention provides a deodorizing system for removing odor components generated from a thermal equipment which utilizes a gas current having a medium/low temperature as a heat source, comprising: a thermal equipment; a deodorizing furnace provided with a burner which mixes gas including the odor components emitted from the thermal equipment into a flame and burns it; and an out-of-furnace circulating path which includes a circulating passage connected to the thermal equipment, a circulating fan and the deodorizing furnace through a pair of circulating openings, takes out combustion exhaust gas from the deodorizing furnace to the outside of the furnace through one circulating opening and passes the combustion exhaust gas through the thermal equipment to flow back into the deodorizing furnace through the other circulating opening. Further, the out-of-furnace circulating path comprises regenerators provided to positions dose to the pair of circulating openings of the deodorizing furnace, respectively, and a passage switching device for periodically switching a direction of a gas current between the circulating fan and the regenerators. Burning the burner and changing over the passage switching device periodically switch a direction of the gas current to the deodorizing furnace, and the combustion exhaust gas taken out from the deodorizing furnace is turned into the hot air having a medium/low temperature required for the thermal equipment through the regenerators and it is then fed to the thermal equipment. Further, the recirculating gas including odor components generated in the thermal equipment is again made to have a high temperature through the regenerators and flows back into the deodorizing furnace for combustion.

According to this deodorizing system, when the combustion exhaust gas in the deodorizing furnace having used for incinerating or thermally decomposing the odor components passes through the regenerator on the intake side of the out-of-furnace circulating path, the sensible heat of the combustion exhaust gas is partially recovered by the regenerator so that this gas be turned into the gas current having a medium/low temperature utilized in the thermal equipment and then supplied to the thermal equipment. Upon completing a predetermined operation in the thermal equipment, the gas is made to have a high temperature by using the recovered heat in the regenerator on the outlet side of the out-of-furnace circulating path and the gas is returned into the deodorizing furnace. Therefore, of the heat generated in the deodorizing furnace, the heat which can not be satisfactorily recovered by the regenerator and is wasted can be used as a heat source for the thermal equipment, thereby reducing the size of the facility and the cost without requiring a separate hot blast stove for the thermal equipment. In addition, the heat wasted in the regenerator for obtaining the hot air having a medium/low temperature is again recovered and returned into the deodorizing furnace when supplying the odor gas generated in the thermal equipment to the deodorizing furnace, and hence the deodorizing system which does not exhaust the heat unnecessarily and has a high thermal efficiency can be realized.

Furthermore, according to the deodorizing system of this invention, since the recirculating gas including the odor components which are flown back into the deodorizing furnace via the thermal equipment is again made to have a high temperature through the regenerators, a temperature of the atmosphere gas in the deodorizing furnace can be readily controlled by adjusting a quantity of an increase in heat effected by combustion of the burner, i.e., adjusting a quantity of fuel injection. Moreover, the ignitionability and the stability of flames are improved and the flames can not be blown out even though the oxygen density is low and the flow velocity increases because the recirculating gas is flown back at a high temperature and a temperature at the ignition point can not be easily lowered. Also, the drying or foaming process in the thermal equipment consumes the heat of the recirculating gas current, and hence the balanced temperature in the out-of-furnace circulating path does not increase.

Here, adopting a pair of burners which alternately perform combustion as the above-mentioned burner causes alternate combustion and the recirculating gas current whose direction periodically changes in synchronism with the alternate combustion in the deodorizing furnace to improve the mixing of the gas in the deodorizing furnace and to smooth (average) the temperature in the deodorizing furnace.

Further, incineration or thermal decomposition of the odor components can be efficiently performed in the wide area in the deodorizing furnace, and reduction in NOx can be also realized. Furthermore, according to this deodorizing system, since averaging the temperature in the deodorizing furnace and improving the mixing state of the gas contribute to make the volume ratio of the furnace space, which is effective for incineration or thermal decomposition of the odor gas in the deodorizing furnace, larger than that of the prior art, reduction in the volume of the deodorizing furnace or enhancement of the processing ability is possible, thereby reducing the size of the deodorizing furnace.

Further, in the deodorizing system according to the present invention, the circulating opening is formed in the vicinity of the burner or it takes the form of a burner throat of the burner. In this case, the recirculating gas current including the odor components generated in the thermal equipment is assuredly mixed in the flames, and hence combustion or thermal decomposition of the odor components can be attained in a relatively-small space. Therefore, the volume of the deodorizing furnace can be reduced.

In addition, the circulating fan is provided between the regenerator and the thermal equipment and on both the upstream side and the downstream side of the thermal equipment, respectively, in the deodorizing system according to the present invention. In such a case, gas circulation between the deodorizing furnace and the thermal equipment can be realized without being interfered with incursion of the air current into the thermal equipment.

Moreover, the deodorizing system according to the present invention has a circulation amount adjusting damper and a dust collector provided on the upstream side of the thermal equipment in the out-of-furnace circulating path. According to this deodorizing system, a required quantity of the recirculating gas is taken out from the deodorizing furnace to the out-of-furnace circulating path in the thermal equipment such as a hot-air drier oven or a foaming oven. Further, dust components contained in the recirculating gas are collected by the dust collector before being led into the thermal equipment and then supplied as clean hot air having a medium/low temperature. Thus, this does not adversely influence operations performed in the thermal equipment, such as the drying or foaming operation. Also, an appropriate quantity of the gas current required in the thermal equipment such as a hot-air drier or a foaming oven can be supplied by adjusting a quantity of the recirculating gas current.

Furthermore, the deodorizing system according to the present invention provides a bypass means for directly connecting the upstream and the downstream of each regenerator in order that part or all of the recirculating gas bypasses the regenerator and flows into the out-of-furnace circulating path to enable temperature adjustment. In this case, changing allotment of the recirculating gas current passing through the regenerator and the counterpart bypassing through the bypass means can readily adjust a temperature of the recirculating gas to be supplied to the thermal equipment.

In addition, the deodorizing system according to the present invention is provided with a mist capturing means at a position close to the thermal equipment of each regenerator, i.e., on the low-temperature side of each regenerator. In this case, the mist carried by the exhaust from the thermal equipment is captured by the mist capturing means before passing through the regenerator and then dried to become dusts when the recirculating gas taken out from the deodorizing furnace passes through the regenerator. Accordingly, it is possible to prevent the mist from entering in the deodorizing furnace and the recirculating gas can be kept clean by periodically disposing the dusts.

In the deodorizing system according to the present invention, it is preferable to use a regenerative burner system provided with regenerators for alternately burning a pair of burners which supply combustion air from the outside of the deodorizing furnace through the regenerators or exhaust combustion exhaust gas to the outside of the deodorizing furnace. In this case, when exhausting the combustion gas, since its sensible heat is recovered in the regenerators and again used for preheating the combustion air with an extremely high thermal efficiency to be returned to the inside of the furnace, a temperature of the combustion air can be a high temperature close to a temperature of the combustion exhaust gas that flows out toward the regenerators, and the high thermal efficiency can be maintained. Further, combustion of the burners is carried out by using the combustion air which does not relate to the gas circulating between the deodorizing furnace and the thermal equipment, and the odor gas having a low oxygen density in the exhaust gas flowing back from the thermal equipment can be also deodorized.

In addition, in the deodorizing system according to the present invention, there may be provided a burner which has a fuel nozzle for blowing fuel in synchronism with changeover of a direction of the gas current and uses as the combustion air a part of the recirculating gas that circulates the out-of-furnace circulating path and has an oxygen density enough for maintaining stable combustion, and an exhaust means for exhausting gas that is generated by combustion and incurred air on the upstream side of the thermal equipment. According to this deodorizing system, when the oxygen density of the gas flowing back from the thermal equipment is enough for maintaining stable combustion because of incurred air, fuel can be burned by only injecting a part of the recirculating gas from the circumference of the fuel nozzle.

Moreover, in this deodorizing system, it is preferable to provide a gas current restricting orifice and a throat so as to supply the recirculating gas having a range of optimum air ratio suitable for a quantity of fuel injection from the circumference of the fuel nozzle. In this case, a quantity of combustion in the deodorizing furnace can be controlled by only adjusting fuel injection. According to this invention, a quantity of combustion in the deodorizing system can be controlled by only adjusting a quantity of fuel injection because the recirculating gas having a range of optimum air ratio suitable for the injection quantity is supplied from the circumference of the fuel nozzle.

Further, the deodorizing system according to the present invention comprises an air quantity adjusting damper and a regenerator, and the deodorizing system may provide a pair of changeover regenerative burners for alternately burning a pair of burners which supply combustion air through the regenerator or exhaust combustion gas in synchronism with changeover of a direction of the gas current and provide on the upstream side of the thermal equipment an exhaust means for supplying as combustion air the exhaust having an oxygen density that is exhausted from the thermal equipment in the out-of-furnace circulating path on the upstream side of each air quantity adjusting damper and enough for maintaining stable combustion and for exhausting only combustion generated gas and incurred gas.

According to this deodorizing system, since the recirculating gas current having a predetermined temperature required in the thermal equipment can be obtained by the overall out-of-furnace circulating path even though heat exchange is carried out with taking into account only the temperature efficiency in the regenerator of the regenerative burner, the high thermal efficiency can be obtained, and a low-temperature damper can be used because the recirculating gas passing through the air quantity adjusting damper has a low temperature.

In any of the above-mentioned deodorizing systems according to the present invention, since only the combustion gas generated due to an increase in heat and the air incurred into the thermal equipment are exhausted gas generated in the overall system and they are exhausted at an extremely low temperature, it is possible to attain the high thermal efficiency which can not be obtained in the prior art deodorizing system.

BEST MODES FOR EMBODYING THE INVENTION

The configuration of the present invention will now be described hereunder in detail in conjunction with illustrative embodiments.

Figure 1:
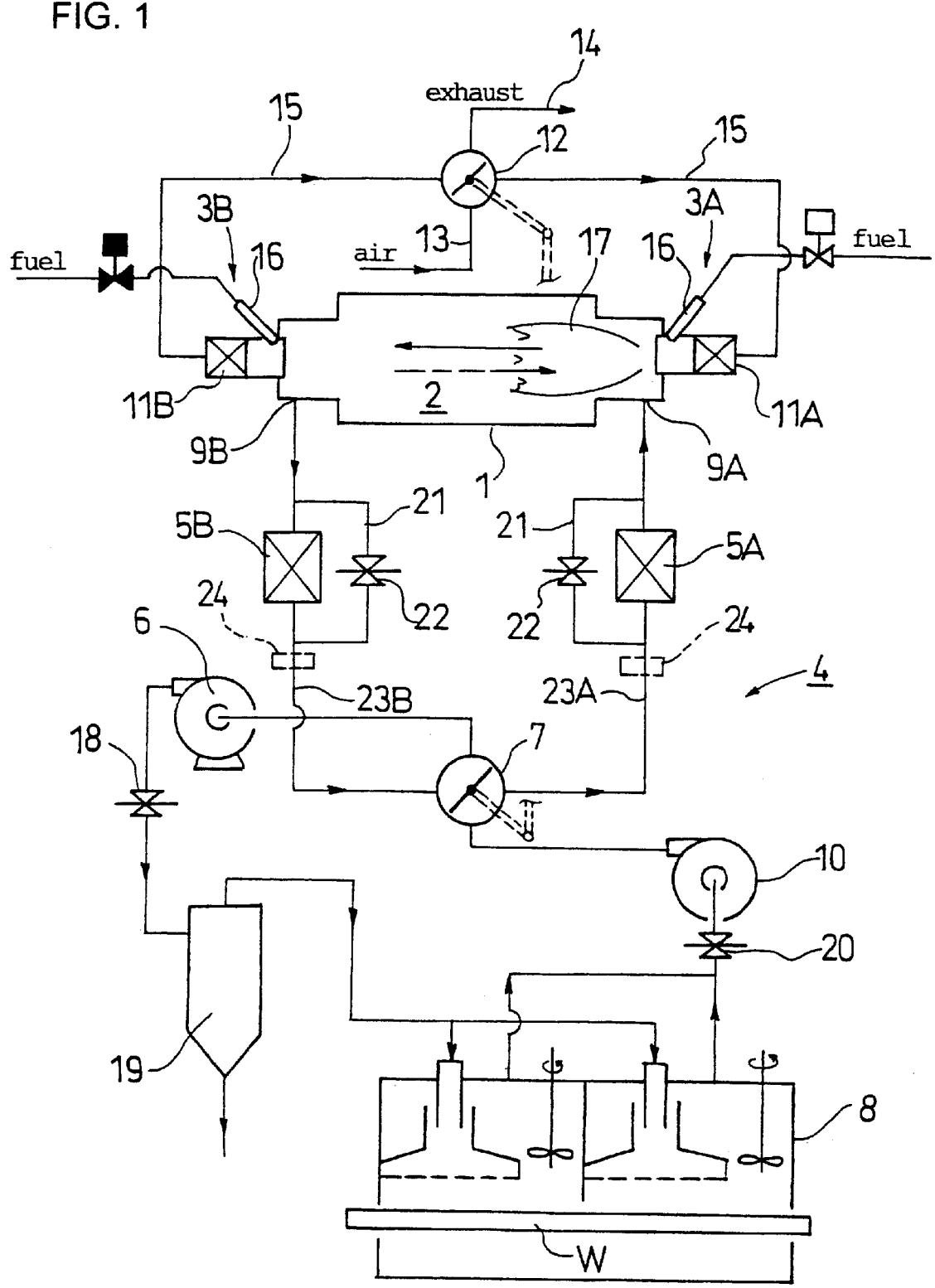
FIG. 1 shows a preferred embodiment of a deodorizing system according to the present invention and is a principle view of the deodorizing system for realizing deodorization of odor gas having a low oxygen density.

FIG. 1 shows an embodiment in which the present invention is applied to a preferred deodorizing system for deodorizing odor gas having a low oxygen density. This deodorizing system is mainly composed of a deodorizing furnace 1 provided with at least a pair of burners 3A and 3B which alternately perform combustion, an out-of-furnace circulating path 4 for temporarily taking out combustion gas generated in the deodorizing furnace 1 and again flowing it back from another position into the deodorizing furnace 2, and a thermal equipment 8 constituting a part of the out-of-furnace circulating path 4 and using a gas current having a medium/low temperature as a heat source, and gas containing the odor generated in the thermal equipment 8 is burnt and removed in the deodorizing furnace 1 by recirculating the gas current between the thermal equipment 8 and the deodorizing furnace 1.

The out-of-furnace circulating path 4 is provided with a pair of circulating openings 9A and 9B, regenerative beds 5A and 5B as a pair of regenerators, circulating fans 6 and 10, a passage switching means 7 for selectively and alternately connecting the circulating fans 6 and 10 with one of the regenerative beds 5A and 5B to switch a direction of a flow of a gas current toward the regenerative beds 5A and 5B, and a thermal equipment 8 utilizing a gas current having a medium/low temperature as a heat source in order that a strong recirculating current (indicated by arrows) whose gas current direction is periodically inverted in accordance with changeover of combustion of the pair of burners 3A and 3B of the deodorizing furnace 1 is formed in the deodorizing furnace 2. Here, the strong recirculating current means a recirculating gas current having a volume much larger than that of the supplied gas current.

The passage switching means 7 is positioned between the deodorizing furnace 1 and an intake of the circulating fan 6 and between the deodorizing furnace 1 and an outlet of the circulating fan 10 and provided in such a manner that ducts 23A and 23B communicating with two circulating openings 9A and 9B provided to the deodorizing furnace 1 be connected to two (two ports provided at positions where these two ports do not communicate with each other) out of four ports while the intake of the circulating fan 6 and the outlet of the circulating fan 10 be connected with the remaining two ports and that one of the circulating openings 9A and 9B be connected with the circulating fan 6 while the other be connected with the circulating fan 10. The circulating openings 9A and 9B formed in the deodorizing furnace 2 of the out-of-furnace circulating path 4 are arranged in the vicinity of respective burner throats of the burners 3A and 3B so that the recirculating gas current flowing back from the thermal equipment 8 collides with flames and combustion gas. It is to be noted that the passage switching means 7 is not restricted to a four-way valve and it can be substituted by any other passage switching means having the same function. In addition, the passage switching means 7 is connected with a control four-way valve 12 for alternately burning the pair of burners 3A and 3B by means of a link or the like, and the passage switching means 7 and the four-way valve 12 can be switched in synchronism with each other.

Further, the out-of-furnace circulating path 4, having the regenerative beds 5A and 5B as the regenerators in the vicinity of the circulating openings 9A and 9B provided to the deodorizing furnace 1, recovers a part of sensitive heat of combustion exhaust gas taken out from the deodorizing furnace 1 by the regenerative beds 5A and 5B and circulates it after turning into a gas current having a medium/low temperature suitable for being used in the thermal equipment 8. Furthermore, it again turns it into a high-temperature gas current by direct heating in the regenerative beds 5A and 5B when flowing it back into the deodorizing furnace 1. Here, either the intake side of the circulating fan 6 or the outlet side of the circulating fan 10 is selectively connected with the respective circulating openings 9A and 9B through the passage switching means 7, and the combustion exhaust gas taken out from the deodorizing furnace 1 through one of the regenerative beds 5A and 5B is supplied to the thermal equipment 8 while the exhaust containing odor gas generated in the thermal equipment, namely, the recirculating gas is flowed back to the deodorizing furnace 1. It is to be noted that a circulation quantity adjusting damper 18 for adjusting a quantity of the recirculating gas current and a dust collector 19 are provided between the circulating fan 6 and the thermal equipment 8. Dusts and others are removed and an appropriate quantity of the dean recirculating gas current is supplied to the thermal equipment 8. The circulation quantity adjusting damper 18 flows the medium/low-temperature combustion exhaust gas, i.e., the recirculating gas whose quantity is required in the thermal equipment 8. Further, a dust collector for a low temperature such as a bag filter may be used as the dust collector 19.

Also, a furnace pressure adjusting damper 20 is provided between the thermal equipment 8 and the circulating fan 10. The furnace pressure adjusting damper 20 balances an exhausting quantity and a recirculating quantity of the gas by maintaining the atmospheric pressure or a pressure slightly-lower than the atmospheric pressure in the thermal equipment 8. This prevents the odor gas generated in the thermal equipment 8 from leaking outside the system. It is to be noted that the thermal equipment 8 uses the gas current having a medium/low temperature as a heat source to apply a predetermined process such as a drying or foaming process on the work W.

A bypass 21 is provided to each of the regenerative beds 5A and 5B of the out-of-furnace circulating path 4, and a temperature adjusting bypass damper 22 is disposed to the bypass 21. The temperature adjusting bypass damper 22 flows a part of the combustion exhaust gas, i.e., the recirculating gas taken out from the deodorizing furnace 1 to the passage switching means 7 without passing through the regenerative beds 5A and 5B and adjusts the recirculating gas to have a desired temperature by mixing the recirculating gas and the gas which has passed through the regenerative beds 5A and 5B.

Further, a regenerative burner system is adopted as a pair of burners 3A and 3B attached to the deodorizing furnace 1 in this embodiment. The regenerative burner system selectively and alternately connects the pair of burners 3A and 3B having regenerators which are regenerative beds 11A and 11B to an air supply system 13 or an exhaust system 14 through a passage switching means 12 in order that one of the two burners 3A and 3B performs combustion while the other which is not burning exhausts a large part of combustion gas which has been used for combustion or thermal decomposition of odor components contained in the recirculating gas. The respective burners 3A and 3B are provided on, e.g., the both side walls of the deodorizing furnace 1 so as to be opposed to each other and they alternately operate. Note that the burners 3A and 3B do not have to be separately arranged on the both side walls of the deodorizing furnace 1 so as to be opposed to each other, and they may be provided on, e.g., one wall of the deodorizing furnace 1 according to circumstances. Incidentally, reference numeral 16 denotes a fuel nozzle in the drawing.

The regenerative beds 11A and 11B are accommodated in burner bodies, different casings or the like and incorporated in the burners 3A and 3B, respectively. The regenerative beds 11A and 11B perform heat exchange with the combustion exhaust gas passing therethrough to recover the wasted heat and preheat the combustion air by using the recovered heat. The regenerative beds 11A and 11B of the respective burners 3A and 3B are connected with two (two ports provided at position where they do not communicate with each other) out of four ports of the four-way valve 12 through ducts 15. Further, an air supply system 13 and an exhaust system 14 are connected with two remaining ports of the four-way valve 12. As to the burners 3A and 3B and the regenerative beds 11A and 11B, one burner and one regenerative bed are connected with the air supply system 13 while the remaining burner and regenerative bed are connected with the exhaust system 14, their connection can be switched by changing over the four-way valve 12. Note that the four-way valve 12 and the passage switching means 7 are changed over in synchronism with each other.

Here, it is preferable to use the structure and material whose pressure loss is relatively low but heat capacity is large and which have the improved durability, e.g., a ceramic cylindrical body which has a plurality of cells and a honey-comb shape for the regenerative beds 11A and 11B used in the burners 3A and 3B and the regenerative beds 5A and 5B provided in the out-of-furnace circulating path 4. For example, a honey-comb-shaped member manufactured by extrusion-molding the ceramic material such as cordierite or mullite may be preferably used for heat exchange between a fluid having a high temperature of approximately 1000° C. such as the combustion exhaust gas and a counterpart having a relatively-low temperature of approximately 20 through 200° C. such as the combustion air or the odor gas. Further, as a honey-comb-shaped regenerative bed, it may be possible to employ a material other than aluminum or ceramics, e.g., a metal such as a heat-resisting steel or a complex of ceramics and a metal, e.g., an $Al_2O_3$—Al complex or an SiC—$Al_2O_3$—Al complex whose pores are completely filled up. This type of complex can be manufactured by causing the melted metal to spontaneously penetrate into pores of the ceramics having a porous structure, oxidating or nitriding a part of that metal to turn into ceramics. It is to be noted that the honey-comb shape essentially indicates hexagonal cells (holes) but it includes the structure having square or triangular cells as well as hexagonal cells formed thereto in this specification. In addition, the honey-comb-shaped regenerative bed may be obtained by bundling tubes or the like without performing integral molding. However, the shapes of the regenerative beds 5A, 5B, 11A and 11B are not restricted to the honey-comb shapes, and flat-plate-type or corrugated-plate-type regenerative materials may be radially arranged in a cylindrical casing or pipe-like regenerative materials may be filled in a cylindrical casing in such a manner that the fluid can pass through the materials in the axial direction. Further, a cylindrical casing in which two chambers are formed by a partition wall in the circumferential direction and the fluid can pass in the axial direction may be prepared, and the regenerative bed may be constituted by filling a lump of the spherical, short-pipe-like, short-rod-like, small-piece-type, nugget-type or net-type regenerative material in each of the chambers.

According to the deodorizing system having the above-mentioned arrangement, using only a heat source of the deodorizing furnace 1 can realize operation of the thermal equipment 8 and deodorization of the gas containing the odor generated in the thermal equipment 8 in the following manner.

A non-stationary flame is formed in the furnace 2 by alternately burning the pair of burners 3A and 3B in the deodorizing furnace 1 in order to burn or thermally decompose the odor components in the recirculating gas flowing back from the thermal equipment 8 by using the combustion heat. Here, the burners 3A and 3B are switched in a short period of, e.g., not more than 60 seconds, or more preferably, approximately 20 seconds or a shorter time. The changeover of combustion is performed by turning on/off injection of fuel and switching the four-way valve 12 for the combustion air. The combustion air is preheated by the regenerative bed 11A or 11B having heated by heat of the exhaust gas and comes to have an extremely-high temperature (for example, approximately 800 through 1000° C.). When the combustion air has such a high temperature, a temperature of the mixed gas itself approximates to or becomes higher than a temperature of self ignition of the fuel even though the oxygen density is low, and an increase in a response speed or a prominent extension of combustible limit largely contribute stability of combustion, resulting in the excellent combustion. Therefore, incineration or thermal decomposition of the odor components is possible without hindering combustion even though the oxygen density of the recirculating gas flowing back from the thermal equipment 8 is low. Also, since the recirculating gas flowing back from the thermal equipment 8 comes to have a high temperature by heat exchange performed between the regenerative beds 5A and 5B, a temperature at an ignition point is not extremely lowered even if the recirculating gas current collides with a flame 17, whereby the flame is not blown off.

Meanwhile, on the burner connected to the exhaust system 14, the combustion gas which has been used for burning or thermally decomposing the odor components is exhausted to the outside of the furnace through the burner throat. Here, the sensible heat of the exhaust gas is recovered by the regenerative bed 11A or 11B in order that the exhaust gas has a low temperature, and the exhaust gas is then exhausted through the exhaust system 14.

At the same time, a part of the combustion gas is taken out to the out-of-furnace circulating path 4 through one of the circulating openings 9A and 9B as the recirculating gas and used as a heat source of the thermal equipment 8. Thereafter, it is again flowed back from the remaining circulating opening 9A or 9B to the deodorizing furnace 1. That is, a part of the atmosphere gas in the deodorizing furnace 2 circulates between the deodorizing furnace 1 and the thermal equipment 8 via the out-of-furnace circulating path 4. For example, in the state shown in FIG. 1, the combustion gas in the deodorizing furnace 2 is taken out to the out-of-furnace circulating path 4 through the regenerative bed 5B of the circulating opening 9B by a negative pressure generated by the circulating fan 6. In this process, a part of the sensible heat of the recirculating gas current is wasted in the regenerative bed 5B and the recirculating gas current comes to have a desired temperature in order that this current can be used in the thermal equipment 8. Here, the full quantity of the recirculating gas current does not necessarily pass through the regenerative bed 5B and a part of the recirculating gas current passes through the temperature adjusting bypass damper 22 if necessary. The recirculating gas current which has passed through the regenerative bed 5B on the downstream side thereof so as to have a low temperature is mixed with the recirculating gas current which has bypassed the regenerative bed 5B to maintain a high temperature in order to generate the recirculating gas having a temperature (medium/low temperature) required in the thermal equipment 8. For example, the combustion exhaust gas having a temperature of 800° C. is taken out from the deodorizing furnace 1 to generate the recirculating gas current having a temperature of 300° C. This recirculating gas current is led into the thermal equipment 8 via the passage switching means 7, the circulating fan 6, the circulation quantity adjusting damper 18 and the duct collector 19 in the mentioned order. This recirculating gas current is then used for a predetermined process such as a drying or foaming process.

The recirculating gas current having been used for the operation in the thermal equipment 8 is taken out from the thermal equipment 8 by an induced draft fan 10, passes through the furnace pressure adjusting damper 20 and the passage switching means 7 in the mentioned order, and flows back from the circulating opening 9A of the burner 3A performing combustion into the deodorizing furnace 1. Here, the recirculating gas current is heated by the regenerative bed 5A to again have a high temperature and flowed back into the deodorizing furnace 1. For example, even if a temperature of the recirculating gas current is lowered to approximately 200° C. when it is taken out from the thermal equipment 8, the recirculating gas current is heated to have a temperature of approximately 700° C. by passing through the regenerative bed 5A so that this gas current be returned into the deodorizing furnace 1 assuming that the air or the like entered into the thermal equipment 8 can be ignored.

As mentioned above, since the deodorizing system according to the present invention recovers a part of the sensible heat of the gas in the deodorizing furnace by the regenerative beds 5A and 5B to generate a gas current having a medium/low temperature which can be used in the thermal equipment 8 and returns the recirculating gas containing the odor components exhausted from the thermal equipment 8 into the deodorizing furnace 1 after turning the recirculating gas into a high-temperature gas again by utilizing the recovered heat, the temperature can not be largely lowered even though the recirculating gas containing the odor is mixed with the combustion gas or the flame, and the non-stationary flame generated due to alternate combustion contributes to make the temperature distribution in the furnace uniform, thereby attaining incineration or thermal decomposition of the odor components in a short time. Further, occurrence of no local high-temperature area reduces NOx to be generated.

It is to be noted that the above has described a preferred embodiment of the present invention, but the invention is not restricted thereto and various modifications or other embodiments are possible within a true scope and spirit of the invention. For example, description has been given as to the invention applied to the regenerative burner system, i.e., a heat source which uses the combustion air different from the gas circulating in the out-of-furnace circulating path 4 to alternately burn the pair of burners 3A and 3B in the foregoing embodiment. However, the present invention is not restricted to the above application, and any other regenerative burner or an usual burner such as shown in FIGS. 2 and 3 may be used, for example.

Figure 2:
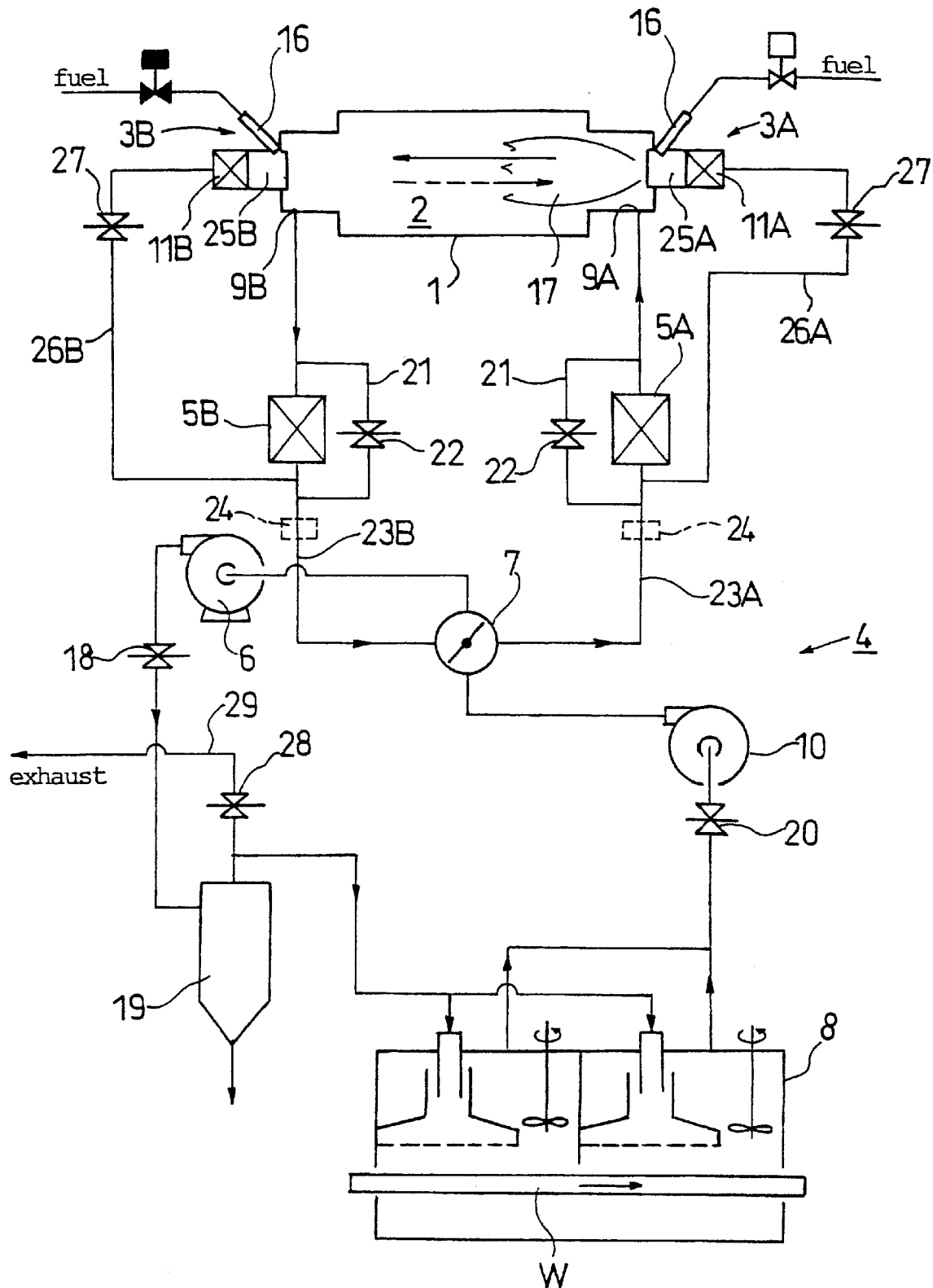
FIG. 2 is a principle view showing another embodiment of the deodorizing system according to the present invention.

FIG. 2 shows another embodiment of a deodorizing system which is preferable to exhaust the gas which contains the odor components and has a high oxygen density from the thermal equipment, for example. This example has a configuration such that burner throats 25A and 25B of a pair of regenerative burners 3A and 3B which alternately perform combustion are connected with ducts 23A and 23B of the regenerative beds 5A and 5B of the out-of-furnace circulating path 4 on the downstream side through ducts 26A and 26B so that a part of the recirculating gas current be supplied to the burners 3A and 3B and utilized as the combustion air. Only the fresh air entering into the thermal equipment 8 is supplied as the combustion air. The burner throats 25A and 25B of the regenerative burners 3A and 3B are connected with the out-of-furnace circulating path 4 through the ducts 26A and 26B on the downstream side of the regenerative beds 5A and 5B. In addition, air quantity adjusting dampers 27 for adjusting a quantity of the combustion air are provided to the connecting ducts 26A and 26B. Moreover, the exhaust system 29 is connected on the upstream side of the thermal equipment 8, or more preferably, between the downstream side of the dust collector 19 and the thermal equipment 8 through the exhaust adjusting damper 28, and a part of the recirculating gas current, i.e., the increased air generated by combustion and the incurrent air are wasted as the excessive air. The recirculating gas including the combustion gas which has been used for incineration or thermal decomposition of the odor components in the deodorizing furnace 1 is partially subjected to heat recovery in the regenerative bed 11A or 11B of either the burner 3A or 3B which is not currently performing combustion and then led to the downstream side of the regenerative bed 5A or 5B of the out-of-furnace circulating path 4. At the same time, the combustion gas is partially taken out to the out-of-furnace circulating path 4 through the circulating opening 9A or 9B and passes through the regenerative bed 5A or 5B where the combustion gas is cooled down to have a predetermined temperature. This gas is thereafter supplied to the thermal equipment 8. It is then used as a heat source of the thermal equipment 8 and flowed back to the deodorizing furnace 1 again. In other words, the combustion exhaust gas containing the recirculating gas circulates between the deodorizing furnace 1 and the thermal equipment 8 through the out-of-furnace circulating path 4, meanwhile the burners 3A and 3B of the deodorizing furnace 1 alternately carry out combustion.

According to the deodorizing system having the above-mentioned arrangement, a part of the combustion gas in the deodorizing furnace 2 passes through the regenerative bed 11B of the burner 3B which is not currently performing combustion and taken out to the out-of-furnace circulating path 4 and the remaining part of the same is taken out to the out-of-furnace circulating path 4 via the regenerative bed 5B of the circulating opening 9B in the state shown in FIG. 2. During this process, the sensible heat of the recirculating gas is partially recovered in the respective regenerative beds 11B and 5B to obtain a desired temperature which can be used in the thermal equipment 8. Here, the recirculating gas current partially passes through the temperature adjusting bypass damper 21 if necessary. The recirculating gas which has passed through the regenerative beds 5B and 11B on the downstream side of the regenerative bed 5B to have a low temperature is mixed with the recirculating gas which has bypassed the regenerative bed 5B to maintain a high temperature in order to generate the recirculating gas current having a desired temperature. This recirculating gas current is led into the thermal equipment 8 through the passage switching means 7, the circulating fan 6, the circulation quantity adjusting damper 18 and the dust collector 19 in the mentioned order. The recirculating gas current is then used for a predetermined process such as a drying or foaming process in the thermal equipment 8. The recirculating gas which has been used for the operation in the thermal equipment 8 is taken out from the thermal equipment 8 by the induced draft fan 10 and passes through the furnace pressure adjusting damper 20 and the passage switching means 7 in the mentioned order. A part of the recirculating gas is then adjusted to have a desired air quantity and supplied from the duct 26A communicating with the burner throat 25A of the burner 3A which is performing combustion so as to be used as the combustion air. Further, the remaining part of the same passes through the regenerative bed 5A to again have a high temperature and then flows back from the circulating opening 9A to the deodorizing furnace 2. In this deodorizing system, since the air quantity adjusting means, i.e., the both dampers 27 and 18 are provided at positions where a temperature of the recirculating gas current is low, a general low-temperature damper can be used. In particular, even if the air quantity adjusting damper 27 positioned in each of the ducts 26A and 26B is used and a temperature obtained by heat recovery in the regenerative beds 11A and 11B is set lower than that required in the thermal equipment 8 with taking into account only the temperature efficiency, the recirculating gas is mixed with the counterpart having a higher temperature on the downstream side in a subsequent process. Therefore, the recirculating gas current having a predetermined temperature required in the thermal equipment 8 can be obtained in the overall out-of-furnace circulating path.

Figure 3:
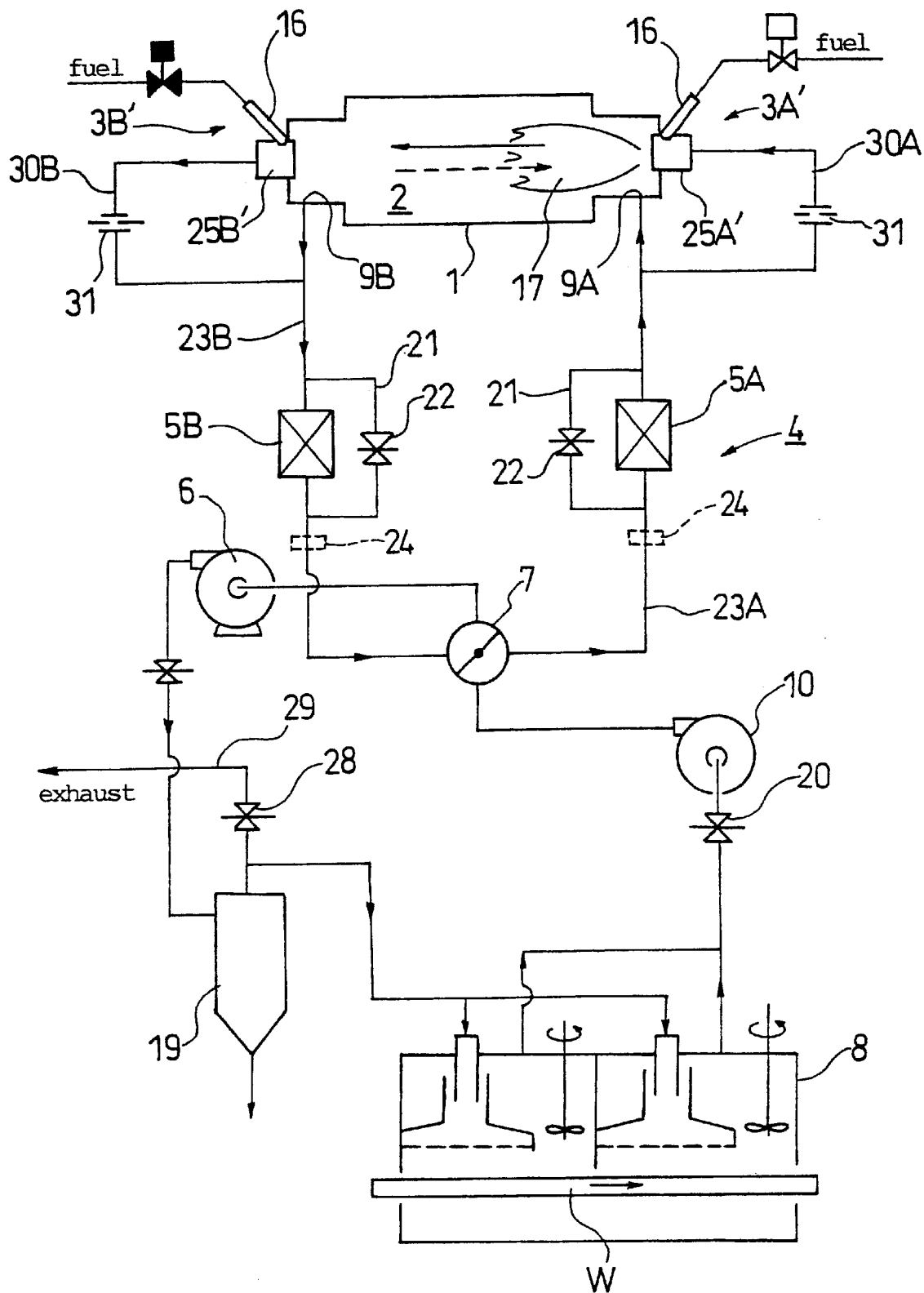
FIG. 3 is a principle view showing still another embodiment of the deodorizing system according to the present invention.

Further, when exhausting the gas which contains the odor gas components and has a high oxygen density from the thermal equipment 8, a deodorizing system such as shown in FIG. 3 can be also embodied. In this embodiment, regular burners 3A' and 3B' having no regenerative bed attached thereto are used as the burners and burner throats 25A' and 25B' are connected with the upstream sides of the regenerative beds 5A and 5B of the out-of-furnace circulating path 4 through ducts 30A and 30B in order to supply a part of the recirculating gas current to the burners 3A' and 3B' as the combustion air. Only the fresh air entering into the thermal equipment 8 is supplied as the combustion air. The burner throats 25A' and 25B' of the burners 3A' and 3B' are connected with the respective ducts 23A and 23B of the out-of-furnace circulating path 4 on the upstream sides of the regenerative beds 5A and 5B, respectively. Further, combustion air restricting orifices 31 for adjusting a quantity of the combustion air are provided to the connecting ducts 30A and 30B, respectively. Moreover, the exhaust system 29 is connected on the upstream side of the thermal equipment 8, or more preferably between the downstream side of the dust collector 19 and the thermal equipment 8 through the exhaust adjusting damper 28, and the increased quantity of the recirculating gas, i.e., the combustion gas generated from combustion and the air entering into the thermal equipment 8 are wasted as the excessive gas.

According to the deodorizing system having the above-mentioned arrangement, the combustion gas in the deodorizing furnace 2 is taken out to the out-of-furnace circulating path 4 through the circulating opening 9B and the burner throat 25B' of the burner 3B' which is not currently performing combustion and circulates in the state shown in FIG. 3. During this process, the sensible heat of the combustion gas is partially recovered in the regenerative bed 5B to have a desired temperature which can be used in the thermal equipment 8. The recirculating gas which has been used for a predetermined process such as a drying or foaming process in the thermal equipment 8 is taken out from the thermal equipment 8 by the induced draft fan 10 and heated by the regenerative bed 5A to again have a high temperature. A part of this gas is then flowed back from the circulating opening 9A into the deodorizing furnace 2 and the remaining part of the same is supplied to the burner throat 25A' through the duct 30A and the orifice 31 as the combustion air to burn the fuel injected from the fuel nozzle 16. Injection of the fuel and the air is switched at predetermined time intervals for alternate combustion of the burners 3A' and 3B'.

Figure 4:
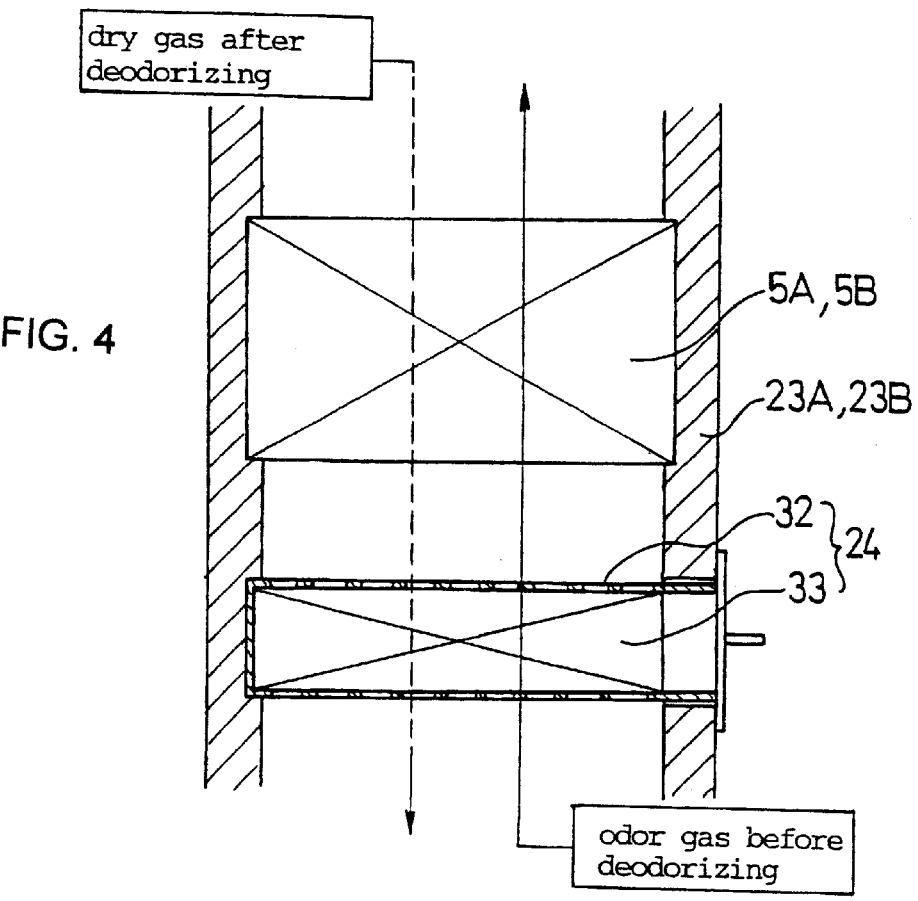
FIG. 4 is a vertical cross-sectional view showing an example of a mist capturing means.
Figure 5:
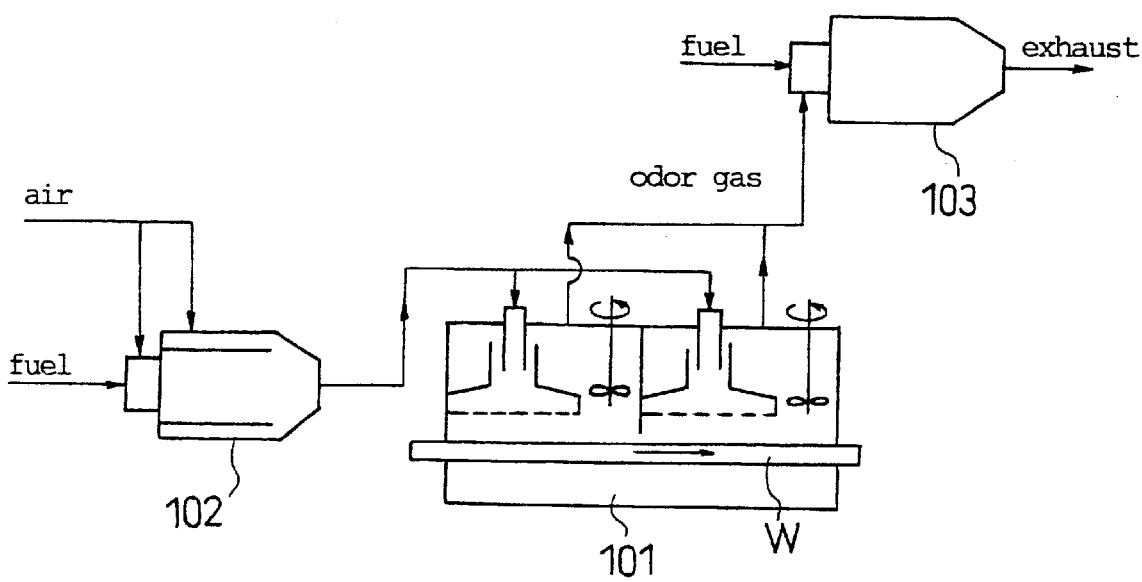
FIG. 5 is a principle view showing an example of a prior art deodorizing system.

Further, the gas flowing out from the deodorizing furnace 1 or the thermal equipment 8 such as a foaming oven is dirty gas containing a large amount of mist, and hence the mist should be removed. As a countermeasure, it is preferable to provide a mist capturing means 24 such as shown in FIG. 4 on the downstream sides of the regenerative beds 5A and 5B of the respective deodorizing systems, e.g., at positions indicated by broken lines in FIGS. 1 through 3. The mist capturing means 24 comprises an air-permeable case 32 such as a punching metal case which can be put into and removed from the ducts 23A and 23B constituting the out-of-furnace circulating path 4 in a direction across a flow of the recirculating gas current without restraint and an air-permeable filling 33 such as metal chips accommodated in the case 32, for example.

When the mist capturing means 24 is provided on a position which is close to the thermal equipment 8 of each of the regenerative beds 5A and 5B and where the relatively-low-temperature gas flows, the mist in the gas can be attracted to the air-permeable filling 33 and removed when the non-deodorized recirculating gas including the odor components from the thermal equipment 8 passes through such a means. The mist captured by the mist capturing means 24 is dried and turned into dusts when the deodorized dry gas, i.e., the recirculating gas supplied from the deodorizing furnace 1 passes by switching the flow direction of the gas current. Repeating this process in accordance with periodical changeover of the flow of the gas current causes the dusts to be deposited to the mist capturing means 24. It is enough to periodically take out the case 32 from the ducts 23A and 23B and clean the filling 33.

In addition, although the above has mainly described the respective embodiments in which a combination of a pair of regenerative burners which alternately perform combustion is adopted as a heat source, the present invention is not restricted to this structure, and one burner may continuously effect combustion. In this case, it is preferable to arrange the burner so as to blow the recirculating gas injected from the pair of circulating openings 9A and 9B to the flame. Further, a heat source such as a radiant tube burner may be employed.

What is claimed is:

1. A deodorizing system for removing odor components generated from thermal equipment using a gas current as a heat source, comprising:

thermal equipment;

a deodorizing furnace provided with a burner and a pair of circulating openings; and an out-of-furnace circulating path, which includes a circulating passage connected with the thermal equipment, and a circulating fan, the circulating path being connected to the deodorizing furnace through the pair of circulating openings; the out-of-furnace circulating path taking out combustion exhaust gas from the deodorizing furnace to the outside of the furnace through one of the circulating openings and flowing back the combustion exhaust gas into the deodorizing furnace through the other circulating opening after passing the combustion exhaust gas through the thermal equipment; and the out-of-furnace circulating path having regenerators provided at positions adjacent the pair of circulating openings of the deodorizing furnace, the circulating fan and a passage switching apparatus periodically switching and inverting a direction of a gas current between the circulating fan and the regenerators, wherein changing over the passage switching apparatus causes a direction of the gas current to the deodorizing furnace to be periodically inverted; combustion exhaust gas taken out from the deodorizing furnace being heated to a temperature required in the thermal equipment through the regenerators and then supplied to the thermal equipment; and recirculating gas containing odor components generated in the thermal equipment being heated in the regenerators and then flowing back into the deodorizing furnace for combustion.

2. The deodorizing system according to claim 1, wherein the burner is of a regenerative burner system which alternately burns a pair of burners provided with regenerators in synchronism with changeover of a direction of a gas current, the pair of burners supplying combustion air from the outside of the deodorizing furnace or exhausting combustion exhaust gas to the outside of the deodorizing furnace through the regenerators.

3. The deodorizing system according to claim 1, wherein there are provided a pair of changeover regenerative burners which, in synchronism with changeover of a direction of a gas current, alternately burn a pair of burners, having air quantity adjusting dampers and regenerators, which supply combustion air or exhaust combustion exhaust gas through the regenerators, and on the upstream side of the thermal equipment is provided an exhaust means which supplies as combustion air exhaust that is exhausted from the thermal equipment of the out-of-furnace circulating path on the upstream side of each air quantity adjusting damper and has an oxygen density with which stable combustion can be maintained and exhausts only gas generated by combustion and penetrated air.

4. The deodorizing system according to claim 1, wherein the deodorizing system provides: a burner which has a fuel nozzle for blowing fuel in synchronism with changeover of a direction of a gas current and uses as combustion air a part of recirculating gas current that circulates along the out-of-furnace circulating path and has an oxygen density with which stable combustion can be maintained; and an exhaust means for exhausting only gas generated by combustion and incurred air on the upstream side of the thermal equipment.

5. The deodorizing system according to claim 4, wherein a gas current restricting orifice and a throat are provided in order to supply the recirculating gas current having an appropriate air ratio suitable to an injection quantity of fuel from the circumference of the fuel nozzle.

6. The deodorizing system according to claim 1, wherein the circulating fan is provided on each of the upstream side and the downstream side of the thermal equipment between the regenerators and the thermal equipment.

7. The deodorizing system according to claim 1, wherein a circulation quantity adjusting damper and a dust collector are arranged on the upstream side of the thermal equipment in the out-of-furnace circulating path.

8. The deodorizing system according to claim 1, wherein a bypass means for directly connecting the upstream and the downstream of each regenerator is provided in order to enable temperature adjustment by causing a part or all of the recirculating gas current to bypass the regenerator to flow through the out-of-furnace circulating path.

9. The deodorizing system according to claim 1, wherein a mist capturing means is provided to the thermal equipment of each regenerator.

10. The deodorizing system according to claim 1, wherein the circulating opening is formed in the vicinity of the burner.

11. The deodorizing system according to claim 1, wherein the burner is a pair of burners which alternately perform combustion and the circulating opening is a burner throat of the burner.

* * * * *